June 3, 1969

United States Patent Office 3,448,157
Patented June 3, 1969

3,448,157
HYDROFORMYLATION OF OLEFINS
Lynn H. Slaugh, Lafayette, Calif., and Richard D. Mullineaux, Florissant, Mo., assignors to Shell Oil Company, New York, N.Y., a corporation of Delaware
No Drawing. Continuation-in-part of application Ser. No. 280,132, May 13, 1963. This application Sept. 27, 1965, Ser. No. 490,635
The portion of the term of the patent subsequent to Mar. 8, 1983, has been disclaimed
Int. Cl. C07c 45/10, 29/16, 47/02
U.S. Cl. 260—604
20 Claims

ABSTRACT OF THE DISCLOSURE

The process for the production of primary alcohols by reacting a monoolefinic hydrocarbon with carbon monoxide and hydrogen in the presence of a catalyst consisting of cobalt in complex combination with carbon monoxide and a tertiary-phosphine containing only hydrocarbon radicals and having both aliphatic and aromatic carbons attached directly to the phosphorus atom.

---

This application is a continuation-in-part of copending application Ser. No. 280,132, filed May 13, 1963, which is a continuation-in-part of copending application Ser. No. 46,071, filed July 29, 1960 and now abandoned.

This invention relates to the production of aldehydes and/or alcohols from olefinically unsaturated compounds. The invention relates more particularly to the production of aldehydes and/or alcohols by the addition of carbon monoxide and hydrogen to olefinic hydrocarbon in the presence of an improved catalyst.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the oelfin bond may take place to varying degrees under certain conditions with the consequent variation in the products obtained. These processes known in the industry, and referred to herein as hydroformylation, involve reactions which may be shown in the general case by the following equation:

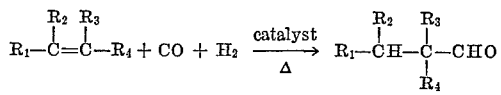

and/or

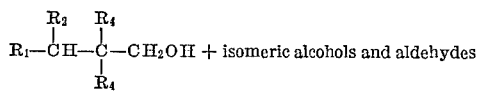

In the above equation, each R represents an organic radical, for example, hydrocarbyl, or a suitable atom such as hydrogen or a halogen. The above reaction is similarly applied to an olefinic linkage in a cycloaliphatic ring.

In the past, dicobalt octacarbonyl as such or in several different forms, generally has been used as the catalyst for the hydroformylation of olefins. This catalyst, which can be prepared from many forms of cobalt, usually decomposes rapidly unless high pressures (1000–4500 p.s.i.g.) of carbon monoxide are maintained. Correspondingly high pressures of hydrogen are also necessary. A most serious disadvantage of prior hydroformylation processes, however, has been the necessity of proceeding in two steps when alcohols are desired product. This in processes disclosed heretofore, it is generally necessary first to react the olefin to be hydroformylated with carbon monoxide and hydrogen to form the corresponding aldehyde. It is then necessary to carry out a second reaction with hydrogen to reduce the aldehyde to the alcohol in a separate operation. A different catalyst for the hydrogenation is usually needed for this second step since the hydroformylation catalysts heretofore employed are not sufficiently effective for this purpose. This results in the need for relatively expensive high-pressure equipment and for a large amount of such equipment to handle the two steps.

A further disadvantage inherent in processes directed to hydroformylation disclosed heretofore is a relative inability to direct the reactions involved to the production of predominantly terminal alcohols when the olefin contains more than two carbon atoms, particularly when the charge to the process comprises primarily internal olefins.

It is therefore an object of the present invention to provide an improved hydroformylation process enabling the more efficient production of aldehydes and/or alcohols by the catalytic reaction of olefinic compounds with carbon monoxide and hydrogen.

Another object of the present invention is the provision of an improved hydroformylation process enabling the more efficient production of aldehydes and/or alcohols by reaction of olefinic compounds with carbon monoxide and hydrogen in the presence of an improved hydroformylation catalyst.

Still another object of the present invention is the provision of an improved hydroformylation process enabling the more efficient single stage production of alcohols by the reaction of olefinic hydrocarbons with carbon monoxide and hydrogen in the presence of an improved catalyst enabling the use of substantially lower pressures than generally possible heretofore.

Still another object of the present invention is the provision of an improved process enabling the more efficient, direct single stage hydroformylation of internal olefins to reaction products predominating in terminal aldehydes and alcohols. Other objects and advantages of the present invention will become apparent from the following detailed description thereof.

In said applications Ser. Nos. 46,071 and 280,132, there is disclosed the execution of the hydroformylation of olefinic compounds with the aid of novel hydroformylation catalysts consisting essentially of a transition metal in complex combination with carbon monoxide and a biphyllic ligand containing a trivalent atom selected from Group V–A of the Periodic Table having an atomic number of from 15 to 51, wherein said trivalent atom has one available pair of electrons. A preferred complex catalyst comprised in this broad class is that consisting essentially of a complex between cobalt, carbon monoxide and a trihydrocarbylphosphine. These complex catalysts are characterized by unique physical and chemical characteristics comprising extreme stability at exceptionally low pressures, as low as one atmosphere and less, under the conditions prevailing in the hydroformylation systems, and remain stable for long periods even when relatively high temperatures prevail. Under comparable conditions the dicobalt carbonyl catalysts of the prior art have been found to completely decompose to cobalt metal and become entirely inactive. Most important when an alcohol is the desired end product of the hydroformylation reaction, the above-defined complex catalysts permit the reaction to be carried out in one step without requiring a second hydrogenation step.

Another advantage attributable to the complex catalysts is the ability to obtain a very high percentage of the normal or straight-chain aldehyde or alcohol from the starting olefin. In most cases, it is possible to obtain 80% or more of the desired product as a normal or straight chain compound rather than as its various branched-chain isomers.

The complex catalysts comprising cobalt in complex combination with carbon monoxide and a trihydrocarbylphosphine are not necessarily equivalent with respect to their behavior as a hydroformylation catalyst. As disclosed and claimed in said copending application Ser. No. 280,132 those comprising a trialkylphosphine as the biphyllic ligand are outstanding in their ability to effect the direct single stage hydroformylation of normal olefins, including internal olefins, to normal terminal alcohols.

In contrast thereto the catalyst complexes comprising triarylphosphine, such as triphenylphosphine as ligand, posses behavior characteristics under hydroformylation conditions which, although accelerating reaction rate, detract materially from the attainment of alcohol yields and operating conditions commensurate with practical scale hydroformylation operations. The selectivity of the desired normal alcohols is relatively low and the relative insolubility of the triarylphosphine-containing complex in polar media including, for example, alcohols, ketones, etc. presents serious difficulties in the execution of operation procedures of the process.

Surprisingly, however, the substitution of no more than two of the alkyl groups in the trialkyl phosphine ligand by suitable aryl groups, for example, phenyl groups, enables the attainment of increased reaction rates while still maintaining solubility characteristics of the catalyst complex and yields of the desired alcohols commensurate with practical scale operation. The increased reaction rate attained with the complex catalysts comprising a mixed alkylarylphosphine as ligand enables the application of smaller installations, and of consequently reduced initial capital outlay, to hydroformylation with the improved complex-type hydroformylation catalysts. The complex catalysts comprising the mixed alkylarylphosphines as ligand are of particular advantage where a product distribution comprising both normal alcohols and aldehydes is desired.

In accordance with the present invention, olefinic compounds are converted to hydroformylation products comprising saturated aldehydes and/or alcohols having one or more carbon atoms than the olefinic compounds charged, by reacting the olefinic compounds in liquid phase, with carbon monoxide and hydrogen, at a temperature of from about 100° to about 300° C. in the presence of a cobalt catalyst comprising cobalt in complex combination with carbon monoxide and a phosphorus-containing ligand consisting essentially of a trihydrocarbylphosphine in which the phosphorus is trivalent and in which an alkyl group and an aryl group are directly attached to the phosphorus atom, i.e., a tertiary phosphine containing only hydrocarbon radicals and having both aliphatic and aromatic carbons attached directly to phosphorus.

In its active form, the suitable complex cobalt catalysts will contain the cobalt component in a reduced valence state. This will normally be a zero valence state and may suitably be even lower, such as a −1 valence state.

As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent phosphorus comprised in the complex catalyst employed in the process of the invention, the phosphorus atom has one available or unshared pair of electrons. Any trihydrocarbylphosphine having both an alkyl and aryl group directly attached to the trivalent phosphorus provides the foregoing electronic configuration and is a suitable ligand for the cobalt-containing catalysts of the present invention. Trivalent phosphorus of such an electronic configuration is capable of forming a coordinate bond with cobalt in its 0 and −1 valent states. It thus will operate as a ligand in forming the desired cobalt complexes used as catalysts in the present process.

Suitable trihydrocarbylphosphines employed as ligands in the complex catalysts of the present invention comprise the mixed phosphines represented by the empirical formula

(I)

wherein $R^1$ represents an alkyl radical and including aralkyl radicals, acyclic and alicyclic, $R^2$ represents an aryl radical, including alkaryl radicals, linked to the phosphorus atom via a nuclear aromatic carbon atom, and $R^3$ represents a member of the group consisting of alkyl radicals, including aralkyl radicals, acyclic and alicyclic, and aryl radicals including alkaryl radicals. $R^1$ and $R^3$ when alkyl may be of branched or straight chain structure. Preferred cobalt complex catalysts of the above-defined class comprise those wherein the ligand consists of the dialkylmonoarylphosphines and diarylmonoalkylphosphines represented by the foregoing Formula I wherein $R^1$ and $R^3$ when alkyl each contain from 1 to about 20 carbon atoms and $R^2$ and $R^3$ when aryl, each contain from 6 to 20 carbon atoms. Particularly preferred complex catalysts of the above defined class comprise those wherein $R^3$ in the mixed phosphine ligands represented by foregoing Formula I is a phenyl group or an alkyl substituted phenyl group attached directly to the phosphorus atom via a carbon atom in the phenyl nucleus. A particularly preferred group of catalysts within the above-defined class are those wherein the trivalent phosphorus-containing ligand is a dialkylphenylphosphine or a diphenylalkylphosphine wherein each alkyl contains from 1 to about 16 and preferably from 1 to about 12 carbons of straight or branched-chain structure. The term "alkyl" as employed in this specification and attached claims is intended to include not only alkyl but cycloalkyl and aralkyl radicals.

In the dialkylarylphosphines and diarylalkylphosphines defined by Formula I, constituting the biphyllic ligand components of the suitable cobalt complex catalysts, $R^1$ and $R^3$ when alkyl, comprise, for example, methyl, ethyl, propyl, butyl, isobutyl, pentyl, hexyl, heptyl, octyl, nonyl, decyl, undecyl, dodecyl, phenylethyl, phenyloctyl, phenyldodecyl, etc. radicals as well as the corresponding cycloalkyl and phenylcycloalkyl radicals, and $R^2$ and $R^3$ when aryl comprise, for example, phenyl, tolyl, xylyl, ethylphenyl, propylphenyl, isopropylphenyl, diisopropylphenyl, butylphenyl, octylphenyl, trimethylphenyl, ethylmethylphenyl, and the like. These radicals may contain a functional group, such as the carbonyl, carboxyl, nitro, cyano, amino, and hydroxy functional groups, and unsaturated carbon-to-carbon linkages. Suitable trihydrocarbyl phosphines comprise those wherein each hydrocarbyl radical attached to the phosphorus molecule is different from the others, as in the case, for example, in a dialkylarylphosphine as methyllaurylphosphine, and in a diarylalkylphosphine as ethylphenylphenyllaurylphosphine.

It is also suitable for an alkylene radical to satisfy two of the phosphorus valences in the ligand with its two open valences, i.e., two alkyls may be joined by two of their carbons, and thereby form a cyclic compound. The third phosphorus valence is then satisfied by an aryl radical.

Another type of structure involving suitable trivalent phosphorus having an available pair of electrons are those containing a plurality of such phosphorus atoms linked by radicals and wherein both an alkyl and aryl group are directly attached to the phosphorus. This type of a compound is called a bidentate ligand when two such phosphorus atoms are present, a tridentate ligand when three such phosphorus atoms are present, and so forth. Examples of these polydentate ligands include such structures as:

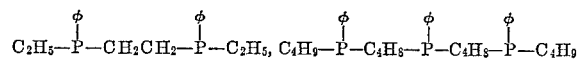

and the like.

Suitable catalysts within the scope of those employed in the process of the invention include, for example, the trihydrocarbylphosphine-cobalt-carbonyl complexes represented by the simplest empirical formula:

$$PR^1R^2R^3)_pCo(CO)_n \qquad (II)$$

wherein $R^1$, $R^2$ and $R^3$ each have the meaning given with respect to the definition of Formula I, and $p$ and $n$ are integers, each having a value of at least 1 and whose sum is 4.

By the symbol $\phi$ as used in this specification and the attached claim is meant the phenylradical.

It is to be understood that the catalysts identified by Formula II may comprise two or more of the simple units. For example, in the suitable catalysts, the complex between cobalt, carbon monoxide, and phosphorus-containing ligand identified by the foregoing empirical Formula II may be monomeric in structure or may be composed of several monoeric units. Thus, the complex formed between cobalt, carbon monoxide and dialkylphenylphosphine, such as, for example, diethylphenylphosphine - cobalt - carbonyl, di-n-laurylphenylphosphine-cobalt-carbonyl, etc., may be present as a dimer, as in $[[(C_{12}H_{25})_2P\phi]Co(CO)_3]_2$.

Specific examples of suitable catalysts of the above-defined class comprise complexes between cobalt, carbon monoxide, and one of the following mixed alkylarylphosphines:

dimethylphenylphosphine
diethylphenylphosphine
dibutylphenylphosphine
dioctylphenylphosphine
didecylphenylphosphine
dilaurylphenylphosphine
dieicosylphenylphosphine
methyldiphenylphosphine
ethyldiphenylphosphine
butyldiphenylphosphine
acetyldiphenylphosphine
decyldiphenylphosphine
lauryldiphenylphosphine
eicosyldiphenylphosphine
methylethylphenylphosphine
dicyclohexylphenylphosphine
methylcyclohexylphenylphosphine
diphenylcyclohexylphosphine
ethyl-bis(beta-phenylethyl)phosphine
1,2-bis diphenylphosphinoethane
dimethyl-2,6-dimethylphenylphosphine
1,6-bis(diphenylphosphino)hexane
naphthylethyl-lauryl-phenylphosphine
phenylethyl-methyl-phenylphosphine Of the above-defined complex cobalt catalst those consisting of cobalt in complex combination with both carbon monoxide and a dialkylphenylphosphine are preferred. Examples of such preferred catalysts are: cobalt-carbonyl-dibutylphenylphosphine $[Co(CO)_3P(Bu)_2\phi]_2$; cobalt-carbonyl-dilaurylphenylphosphine $[Co(CO)_3P(C_{12}H_{25})_2\phi]_2$; and the like as well as the dimers and trimers thereof.

The process of the invention is not limited with respect to the source of the cobalt-containing complexes used as catalysts in the process of this invention. They may be obtained from any suitable source and be prepared by a diversity of methods. A convenient method is to combine an organic or inorganic salt of cobalt with the suitable phosphorus, containing ligand, for example, dialkylarylphosphine such as, for example, didodecylphenylphosphine, in liquid phase. Suitable cobalt salts comprise, for example, cobalt carboxylates such as acetates, octoates, etc., as well as cobalt salts of mineral acids such as chlorides, sulfates, sulfonates, etc. The valence state of the cobalt may then be reduced and the cobalt-containing complex formed by heating the solution in an atmosphere of hydrogen and carbon monoxide. The reduction may be performed prior to the use of the catalysts or it may be accomplished simultaneously with the hydroformylation process of this invention. Alternatively, the catalysts may be prepared from a carbon monoxide complex of cobalt. For example, it is possible to start with dicobalt octacarbonyl and by heating this substance with the suitable phosphorus-containing ligand of the type previously described, for example, dialkylphenylphosphine, the ligand will replace one or more of the carbon monoxide molecules, producing the desired complex catalyst. This latter method was utilized in the preparation of most of the catalysts used in the examples hereinafter described. This method is very convenient for regulating the number of carbon monoxide molceules and phosphorus-containing ligand molecules present in the catalyst. Thus, by increasing the amount of phosphorus-containing ligand added to the dicobalt octacarbonyl more of the carbon monoxide molecules are replaced.

In accordance with the invention, olefinic compounds are hydroformylated to reaction products predominating in aldehydes and/or alcohols by intimately contacting the olefinic compound in liquid phase with carbon monoxide and hydrogen in the presence of the above-defined catalysts comprising a complex or cobalt with both carbon monoxide and a trivalent phosphorus-containing ligand consisting essentially of a dialkylarylphosphine or a diarylalkylphosphine, at well-defined conditions or temperature and pressure.

A particular advantage of the invention resides in the ability of the catalyst to remain stable, exhibit high activity for long periods of time at very low pressures, with increased reaction rates. Consequently, hydroformylation in accordance with the present invention may be carried out at pressures well below 1000 p.s.i.g. to as low as 1 atmosphere or less. Under comparable conditions, catalysts of the prior art such as dicobalt octacarbonyl, often decompose and become inactive. The invention is, however, not limited in its applicability to the lower pressures and pressures in the broad range from atmospheric up to about 2000 p.s.i.g. and up to about 3000 p.s.i.g. and higher may be employed within the scope of the invention. The specific pressure preferably used will be governed to some extent by the specific charge and complex catalyst employed. In general, pressures in the range of from about 300 to about 1500 p.s.i.g. and particularly in the range of from about 400 to about 800 p.s.i.g. are preferred. The unique stability of the catalysts of the present invention at the lower pressures makes the use of pressures below about 1500 p.s.i.g. particularly desirable.

Temperatures employed will generally range from about 100° to about 300° C. and preferably about 150° to about 210° C., a temperature of about 200° C. being generally satisfactory. Somewhat higher or lower temperatures may, however, be used within the scope of the invention.

The ratio of catalyst to the olefin to be hydroformylated is generally not critical and may vary widely within the scope of the invention. The ratio of catalyst to olefin charge may be varied to achieve a substantially homogeneous reaction mixture. Solvents are therefore not required. However, the use of solvents which are inert, or which do not interfere to any substantial degree with the desired hydroformylation reaction under the conditions employed, may be used within the scope of the invention. Saturated liquid hydrocarbons, for example, may be used as solvent in the process, as well as ketones, ethers, and the like. Molar ratios of catalyst to olefin between about 1:1000 and about 10:1 are found to be satisfactory; higher or lower catalyst to olefin ratios may, however, be used within the scope of the invention.

The ratio of hydrogen to carbon monoxide charged may vary widely within the scope of the invention. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed within the scope of the invention. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the alcohol is the desired product, two moles of hydrogen and one mole of carbon monoxide react with each mole of olefin. The minimum ratio of hydrogen to carbon monoxide employed will therefore generally be governed by the product desired. The use of ratios of hydrogen to carbon monoxide which are somewhat higher than those defined by these stoichiometrical values are generally preferred.

A signal advantage of the present invention as indicated above and further evidenced by the following examples is the ability to effect the direct, single stage hydroformylation of the olefins to a reaction mixture wherein the alcohols predominate over the aldehydes. The alcohols obtained from the starting olefins are furthermore generally primarily the straight chain or normal isomers. By selection of reaction conditions within the above-defined range, it is now possible to obtain 80% or more of the product in the form of the normal or straight chain compound rather than as its various branched-chain isomers. Generally, the alcohol is the desired end product and the catalysts defined herein will produce this product under a relatively wide range of conditions. However, by varying the operating conditions within the range described herein, the ratio of aldehyde to alcohol product may be varied somewhat. Adjustment of these variables also permits some control over the particular isomer that will be produced.

A particularly valuable aspect of the invention resides in its ability to effect the direct, single stage hydroformylation of internal normal olefins, having for example, from 4 to 19 carbon atoms to the molecule to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehyde and alcohols having one more carbon than the olefins in the charge and wherein these alcohols are the predominant reaction product. Such suitable feeds consisting of olefinic hydrocarbon fractions include, for example, $C_7$, $C_8$, $C_9$, $C_{10}$ and higher olefinic fractions as well as olefinic hydrocarbon fractions of wider boiling ranges such as $C_7$–$C_9$, $C_{10}$–$C_{13}$, $C_{14}$–$C_{17}$ olefinic hydrocarbon fractions and the like.

Under the above-defined conditions, the olefinic charge will react with carbon monoxide and hydrogen with the formation of reaction products comprising aldehydes and/or alcohols having one more carbon atom per molecule than the olefin charged.

The reaction mixtures obtained may be subjected to suitable catalyst and product separating means comprising one or more such steps, for example, as stratification, flashing, solvent extraction, distillation, fractionation, adsorption, etc. The specific method of product and catalyst separation preferably employed will be governed to some extent by the specific complex and reactants charged. The unusual stability of the complex catalysts at subatmospheric and superatmospheric pressures over a relatively wide temperature range as indicated above, make possible the use of any of the available product separating means. Catalyst, or components thereof, as well as unconverted charge, and solvent, when employed, may be recycled in part or entirety to the reaction zone.

Make-up, preformed cobalt-carbonyl-trihydrocarbyl-phospine complex, or separate components of the complex capable of producing the complex in situ in the reaction zone, may be added to material separated from the reactor effluence which is being recycled to the reaction zone. A part of the alcoholic reaction product may, if desired, be recycled to the reactor to function as solvent and/or diluent and/or suspending medium for catalyst, catalyst components, and the like, passing to the reaction zone. A part or all of the aldehydic hydroformylation products may optionally be recycled to the reaction zone or may be subjected to hydroformylation conditions in a second and separate reaction zone in the presence of a cobalt catalyst in complex combination with carbon monoxide and a trihydrocarbylphosphine. The trihydrocarbylphosphine component of the complex catalyst used in such second hydroformylation step need not be the same as that used in the first step. For example, a dialkylphenylphosphine-containing complex may be used in the first hydroformylation step and a trialkylphosphine in the second.

The process of this invention is generally applicable to the hydroformylation of any aliphatic or cycloaliphatic compound having at least one ethylenic carbon-to-carbon bond. Thus, it is applied to the hydroformylation of olefins comprising the ethylenically unsaturated hydrocarbons having, for example, from 2 to 19 carbons, to reaction mixtures predominating in aliphatic aldehydes and alkanols having one more carbon atom than the starting olefin. The invention is used to advantage in the hydroformylation of carbon-to-carbon ethylenically unsaturated linkages in unsaturated hydrocarbons. Monoolefins such as ethylene propylene, butylenes, amylenes, hexylenes, heptylenes, octylenes, nonylenes, decylenes, undecylenes, dodecylenes, and their homologues, are examples of suitable unsaturated hydrocarbons hydroformylated in the process of the invention. The suitable unsaturated hydrocarbon feeds include both branched- and straight-chain compounds having one or more ethylenic or olefinic sites. When two or more double bonds are present these may be conjugated, as in 1,3-butadiene, nonconjugated, as in 1,5-hexadiene. In the case of polyolefins, it is possible to hydroformylate only one of the olefinic sides or several or all of these sites. The unsaturated carbon-to-carbon olefinic linkages may be between terminal and their adjacent carbon atoms, as in 1-pentene, or between internal chain carbon atoms, as in 4-octene.

Hydroformylation of macromolecular materials involving acyclic units of the above types such as polydiolefins like polybutadiene, as well as copolymers of olefins and diolefins like the styrene-butadiene copolymer, is also comprised within the scope of the invention.

Hydrocarbon cyclic compounds are equally suitable for use in this invention. This group includes the unsaturated alicyclic hydrocarbons such as the cyclic olefins containing carbon-to-carbon unsaturation such as the cycloalkenes like cyclopentene, cyclohexene, and cycloheptene. Also included in this category are the terpenes and fused-ring polycyclic olefins, such as 2,5-bicyclo(2,2,1)heptadiene, 1,4,4a,5,8,8a-hexahydro-1,4,5,8-dimethanonaphthalene and the like.

The process of this invention may also be used to hydroformylate ethylenic carbon-to-carbon linkages of non-hydrocarbons. Thus, it is possible to hydroformylate olefinically unsaturated alcohols, aldehydes, and acids to corresponding alcohols, aldehydes, and acids containing an aldehyde or hydroxy group on one of the carbon atoms previously involved in the olefinic bond of the starting material. The following are a few specific examples of different types of olefinic compounds that may be hydroformylated in accordance with the invention and the products obtained thereby:

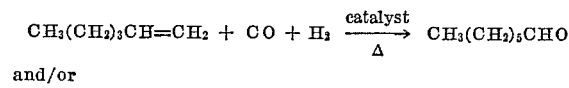
1-hexene                        1-heptanal $CH_3(CH_2)_5CH_2OH$ + isameric products
1-heptanol

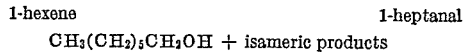
and/or 3-chloropropanal
$ClCH_2CH_2CHO$ + isomeric products
3-chloropropanal

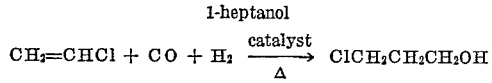
allyl acetate
                     $CH_3COOCH_2CH_2CH_2CHO$
gamma-acetoxybutyraldehyde and/or $CH_3COOCH_2CH_2CH_2OH$ + isomeric products
delta-acetoxybutanol

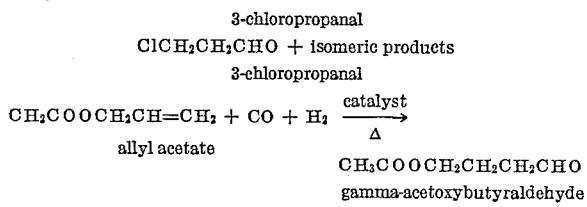

and/or cyclopentylcarbinol

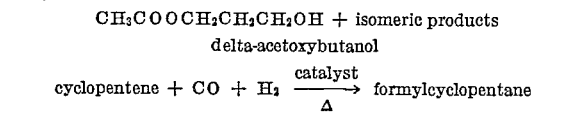
diethyl fumarate
                     CHO
                 |
             $C_2H_5OCOCHCH_2COOC_2H_5$
diethyl alpha-formylsuccinate and/or

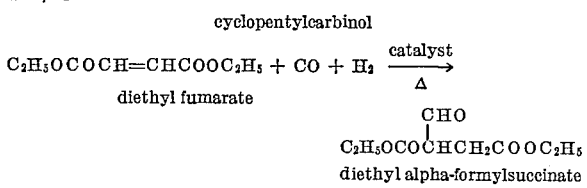
diethyl alpha-methylolsuccinate allyl benzene+CO+H₂ catalyst gamma-phenylbutyraldehyde
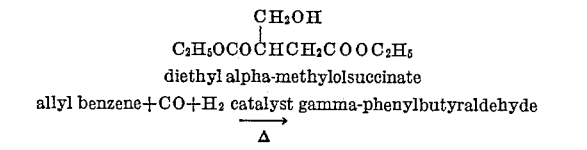

and/or delta-penylbutanol+isomeric products

The olefinic charge to the process of the invention may comprise two or more of the above-defined suitable olefins. Olefinic hydrocarbon fractions are hydroformylated under the conditions above-defined to mixtures of aldehydes and alcohols in which the alcohols predominate.

The following examples are illustrative of the process of this invention. It is to be understood that these examples are given only for illustration and are not to be construed as limiting the invention in any way.

Example I

Cobalt in complex combination with carbon monoxide and diethylphenylphosphine [(Et)₂Pφ] was taken as a typical complex catalyst and 1-pentene as a typical olefin in a pentene hydroformylation operation identified herein as Run No. 1. The catalyst was prepared in situ, in the equipment to be described, from dicobalt octacarbonyl.

The reactor used was a 100-ml. stainless-steel autoclave connected to a 0–1000 p.s.i.a. transducer and to a source of a premixed hydrogen-carbon monoxide gas. The volume of the external fittings was kept to a minimum to provide a maximum sensitivity of pressure to the charge in number of millimoles of hydrogen and carbon monoxide present. The above-indicated components forming the catalyst (i.e., diethylphenylphosphine ligand and dicobalt octacarbonyl) and the olefin were charged to the reactor; a Teflon covered magnetic stirring bar was added; the reactor was closed, evacuated, and pressured with H₂-CO gas until all foreign gases were displaced. The reactor was then heated under sufficient H₂+CO pressure so that the final pressure at reaction temperature was about 400 p.s.i.g. After the temperature was equilibrated, the pressure reduction was recorded. If a large amount of gas was absorbed, the reactor was repressured at suitable intervals. The results are tabualted in the following table.

For the purpose of comparison Runs 2 and 3 were carried out under substantially identical conditions, but with the exception that in Run 2 triphenylphosphine, φ₃P, was employed as the ligand in the complex catalyst and that in Run 3 no ligand was employed.

It is seen from the following results that whereas with dicobalt octacarbonyl or cobalt-carbonyl-triphenylphosphine as catalysts (Runs 2 and 3, respectively), overall conversion and selectivity to alcohol were low and the catalyst decomposed, with the diethylphenylphosphine-containing catalyst (Run 1) conversion of pentene was 100%, selectivity to oxo products and alcohol was high, and the catalyst was stable.

| Charge | Run No. 1 | Run No. 2 | Run No. 3 |
|---|---|---|---|
| | Catalyst | | |
| | Cobalt-carbonyl-diethyl-phenyl-phosphine | Cobalt-carbonyl-triphenyl-phosphine | Dicobalt-octa-carbonyl |
| Ligand | (¹) | (²) | (³) |
| Ligand millimoles | 4 | 4 | 0 |
| Ratio ligand to Co molar | 2 | 2 | |
| Co metal in catalyst, millimoles | 2 | 2 | 2 |
| n-Hexane solvent, ml | 20 | 20 | 20 |
| 1-pentene, mmoles | 64 | 64 | 64 |
| Conditions: | | | |
| Temp., °C | 195 | 195 | 195 |
| Ratio H₂:CO, molar | 1.9 | 1.9 | 1.9 |
| Results: | | | |
| Cat. decomposition | (³) | (⁴) | (⁴) |
| Pentene conversion, percent | 100 | 40 | 63 |
| Selectivity to C₆ aldehydes and alcohols, percent | 78.4 | 71 | 25 |
| Composition of C₆ alcohol, percent: | | | |
| 2-ethyl-1-butanol | 2.3 | 3.1 | |
| 2-methyl-1-pentanol | 18.7 | 30.8 | |
| n-Hexanol | 79.0 | 66 | |

¹ Diethylphenylphosphine.    ² Triphenylphosphine.    ³ None.    ⁴ Complete.

Example II

The steps of Example I were repeated using 1-pentene as the olefin with the following changes:

Catalyst: Cobalt complex with carbon monoxide and 1,2-bis-diphenylphosphinoethane ($\phi_2PCH_2CH_2P\phi_2$)

Catalyst starting materials:
    1,2-bis-diphenylphosphinoethane __millimoles__ 4
    $Co_2(CO)_8$ _____millimoles Co metal__ 2
Temperature _____° C__ 195
Pressure (maximum) _____p.s.i.g__ 530
Results:
    Conversion of the 1-pentene _____percent__ 100
    Selectivity to $C_6$ oxo products _____do____ 69
    Composition of $C_6$ alcohol product:
        2-ethyl-1-butanol _____percent__ 4.3
        2-methyl-1-pentanol _____do____ 39.2
        n-Hexanol _____do____ 56.5

Example III

The steps of Example I were again repeated using 1-pentene as the olefin with the following changes:

Catalyst: Cobalt complex carbon monoxide and diphenylethylphosphine

Catalyst starting materials:
    Diphenylethylphosphine _____millimoles__ 4
    $Co_2(CO)_8$ _____millimoles as cobalt metal__ 2
Temperature _____° C__ 195
Pressure (maximum) _____p.s.i.g__ 500
Results:
    Conversion of the 1-pentene _____percent__ 100
    Selectivity to $C_6$ aldehydes and alcohols _____do____ 78.8
    Selectivity to alcohols _____do____ 74.5
Composition of $C_6$ alcohols product:
        2-ethyl-1-butanol _____percent__ 2.7
        2-methyl-1-pentanol _____do____ 22.8
        n-Hexanol _____do____ 74.5

Example IV

In two operations, identified herein as Runs 6 and 7, respectively, pentene-1 was hydroformylated by reaction with carbon monoxide and hydrogen in the presence of a complex catalyst consisting of cobalt in complex combination with di-n-butylphenylphosphine (($n$-$Bu$)$_2$$P\phi$) under the conditions set forth in the following table. The complex catalyst was prepared in situ by adding di-n-butylphenylphosphine to dicobalt octacarbonyl in the reactor, and heating to 195° C. in the presence of hydrogen and carbon monoxide, thereby forming the cobalt-carbonyl-di-n-butylphenylphosphine catalyst complex of the empirical structure (($n$-$Bu$)$_2$$P\phi$)$Co(CO)_3$.

| Charge | Run No. 6 | Run No. 7 |
|---|---|---|
| Catalyst, cobalt-carbonyl-di-n-butylphenylphosphine complex, mmoles [1] | 2 | 2 |
| 1-pentene, mmoles | 64 | 64 |
| n-Octane (solvent), ml | 20 | 20 |
| Conditions: | | |
|   Temperature, ° C | 195 | 150 |
|   Pressure, p.s.i.g. (max.) | 430 | 500 |
|   Ratio $H_2$:CO, molar | 2 | 2 |
| Results: | | |
|   Catalyst decomposition | None | None |
|   Conversion | 100 | 79.4 |
| Selectivities: | | |
|   To aldehydes and alcohols | 72.1 | 88.7 |
|   To alcohols | 72.1 | 76.4 |
| Composition of $C_6$ alcohol product, percent: | | |
|   n-Hexanol | 80.0 | 88.4 |
|   2-methylpentanol | 18.1 | 10.4 |
|   2-ethylbutanol | 1.9 | 1.2 |

[1] Based on Co expressed as monomeric form of complex.

Example V

In an operation, identified herein as Run No. 8, 1-pentene was hydroformylated by reacting 1-pentene with carbon monoxide and hydrogen in the presence of a complex catalyst consisting of cobalt in complex combination with both carbon monoxide and 1,4-bis-diphenylphosphinobutane ($\phi P(CH_2)_4P\phi_2$) under the conditions set forth in the following table. The complex catalyst was prepared by adding 1,4-bis-diphenylphosphinobutane to cobalt octacarbonyl ($Co_2(CO)_8$) in a molar ratio of 1,4-bis-diphenylphosphinobutane to dicobalt octacarbonyl (in n-octane solvent) of 2 and heating the mixture at 195° C. in the presence of CO and $H_2$.

The operation was repeated as Run No. 9 under substantially identical conditions except that the diphenylphosphinobutane ligand in the catalyst was replaced by 1,5-bisdiphenylphosphinopentane ($\phi_2P(CH_2)_5P\phi_2$).

| | Run No. | |
|---|---|---|
| | 8 | 9 |
| | Catalyst | |
| Charge | Cobalt-carbonyl-1,4-bis-diphenylphosphinobutane | Cobalt-carbonyl-1,5-bis-diphenylphosphinopentane |
| Catalyst, mmoles [1] | 2 | 2 |
| n-Octane (solvent), ml | 20 | 20 |
| 1-pentene, mmoles | 64 | 64 |
| Conditions: | | |
|   Temperature, ° C | 195 | 195 |
|   Pressure, p.s.i.g. (max.) | 500 | 500 |
|   Ratio $H_2$:CO, molar | 2.1 | 2 |
| Results: | | |
|   1-pentene conversion, percent | 100 | 100 |
|   Catalyst decomposition | None | None |
| Selectives, percent: | | |
|   To aldehydes and alcohols | 82.2 | 84.6 |
|   To alcohols | 82.2 | 80.1 |
| $C_6$ alcohol product composition, percent: | | |
|   n-Hexanol | 74.7 | 73.9 |
|   2-methylpentanol | 22.8 | 26.1 |
|   2-ethylbutanol | 2.5 | |

[1] Based on Co expressed as monomeric form of complex.

Example VI

In each of four comparative runs, identified herein as Runs I, II, III and IV, respectively, dodecene-1 was hydroformylated by reaction with carbon monoxide and hydrogen in the presence of a complex catalyst containing cobalt in complex combination with carbon monoxide and a trihydrocarbylphosphine ligand identified in the following table. The reaction was carried out at a temperature of 200° C., a pressure of 1000 p.s.i.g. and a hydrogen to carbon monoxide molar ratio of 2.1. The catalyst complex was present in each run in an amount providing a cobalt concentration in the reaction mixture of 0.2% by weight (calculated as cobalt metal) and a trihydrocarbylphosphine to cobalt ratio of 2.0. Each of the four runs were executed under substantially identical conditions but with the exception that a different trihydrocarbylphosphine ligand was employed in each of the runs. The complex catalyst was prepared in situ by introducing dicobalt octacarbonyl and the trihydrocarbylphosphine ligand into the reaction zone in the controlled relative amounts providing the above indicated catalyst concentration in the reactor and heating in the presence of CO and $H_2$ at 200° C. Under the defined conditions prevailing in the reactor the cobalt - carbonyl - trihydrocarbylphosphine complex was found to be formed. Catalyst complex present in each run was:

Run I—cobalt-carbonyl-trilaurylphosphine
Run II—cobalt-carbonyl-dilaurylphenylphosphine
Run III—cobalt-carbonyl-lauryldiphenylphosphine
Run IV—cobalt-carbonyl-triphenylphosphine Results obtained are indicated in the following table in terms of (a) relative reaction rate, based on that obtained with the trilauryl phosphine-containing complex catalyst, (b) dodecene-1 conversion, (c) conversion to total alcohols and (d) normal tridecanol-1 and branched alcohol content of the alcohol product.

conversion of 98.3% with a selectivity to $C_{13}$ alcohols of 83.2%. The alcohol product contained 63.3% n-tridecanol.

| | Run No. | | | |
|---|---|---|---|---|
| | I | II | III | IV |
| | Cat. ligand | | | |
| | $(C_{12}H_{25})_3P$ trilaurylphosphine (TLP) | $(C_{12}H_{25})_2P\phi$ dilaurylphenylphosphine | $(C_{12}H_{25})P(\phi)_2$ diphenyllaurylphosphine | $(\phi)_3P$ triphenylphosphine |
| Hydroformylation rate relative to TLP | 1.0 | 1.8 | 2.7 | 1.8 |
| Dodecene-1 conversion, percent weight | 100 | 99 | 99 | 100 |
| Selectivity to: | | | | |
| n-Tridecanol-1 | 80 | 74 | 64 | 50 |
| Branched alcohols | 20 | 26 | 36 | 51 |

It is seen from the foregoing Example VI that the substitution of only one, and at most two, of the lauryl groups in the ligand by a phenyl radical increases materially the hydroformylation reaction rate while still enabling the obtaining of predominantly straight chain terminal alcohols.

Example VII

Normal dodecanol was prepared by reacting straight chain undecenes, obtained by successive chlorination and dehydrochlorination of n-decane, with carbon monoxide and hydrogen at 200–220° C. and a pressure of 1200 p.s.i.g. in the presence of a complex cobalt catalyst consisting of cobalt in complex combination with both carbon monoxide and dilaurylphenylphosphine $$((C_{12}H_{25})_2P\phi)$$

The ratio of hydrogen to carbon monoxide used was 2. The catayst concentration in the reactor in terms of cobalt metal was 0.1%. The cobalt-carbonyl-dilaurylphenylphosphine catalyst was prepared in situ by adding dilaurylphenylphosphine to dicobalt octacarbonyl and heating at 200° C. in the presence of hydrogen and carbon monoxide, thereby forming the cobalt-carbonyl-dilaurylphenylphosphine complex found to have the general formula $((C_{12}H_{25})_2P\phi)Co(CO)_3$. There was obtained an 89% $C_{12}$ alcohol yield consisting of 65% normal decanol.

Example VIII

An olefinic hydrocarbon fraction consisting of $C_{11}$ and $C_{12}$ alpha olefins was hydroformylated by reaction with carbon monoxide and hydrogen in a molar ratio of $H_2$:CO of 2, at a temperature of 200° C. and a pressure of 1200 p.s.i.g. in the presence of cobalt-carbonyl-dilaurylphenylphosphine complex as catalyst. The catalyst complex was obtained in situ by adding dilaurylphenylphosphine $((C_{12}H_{25})_2P\phi)$ to dicobalt octacarbonyl and heating to 200° C. in the presence of hydrogen and carbon monoxide. The catalyst complex was found to comprise the empirical unit structure $(C_{12}H_{25})_2P\phi Co(CO)_3$. There was obtained a conversion to aldehydes and alcohols of 95.6% with a $C_{12}$–$C_{13}$ alcohol yield of 84.8%. Repeating the operation under substantially identical conditions but using an olefinic fraction consisting of $C_{13}$ and $C_{14}$ olefin results in a conversion to aldehydes and alcohols of 85.9% with a $C_{14}$–$C_{15}$ alcohol yield of 85.9%.

Example IX

Dodecene was hydroformylated by reaction with carbon monoxide and hydrogen, using a ratio of $H_2$:CO of 2, at 200° C. and 1000 p.s.i.g. in the presence of a catalyst consisting of cobalt-carbonyl-diphenyllaurylphosphine. The concentration of catalyst in the reaction mixture based on cobalt metal was 0.2%. The cobalt-carbonyl-diphenyllaurylphosphine complex used as catalyst was prepared in situ by adding diphenyllaurylphosphine $(C_{12}H_{25}P\phi_2)$ to dicobalt octacarbonyl in a ratio of diphenyllaurylphosphine to dicobalt octacarbonyl of 2 and heating the mixture to 200° C. in the presence of a mixture of hydrogen and carbon monoxide. There was obtained a dodecene The operation was repeated under substantially identical conditions but with the exception that the ligand in the catalyst complex consisted of dilaurylphenylphosphine $(C_{12}H_{25})_2P\phi$, instead of diphenyllaurylphosphine. With the cobalt-carbonyl-dilaurylphenylphosphine complex as catalyst there was obtained a dodecene conversion to $C_{13}$ alcohols and aldehydes of 98.5% with a selectivity to $C_{13}$ alcohols of 82.2%. The $C_{13}$ alcohols obtained contained 73.6% n-tridecanol.

Example X

In a plurality of operations dodecene was reacted with carbon monoxide and hydrogen at 200° C. and a pressure of 1000 p.s.i.g. in the presence of a catalyst consisting of cobalt in complex-combination with both carbon monoxide and a trihydrocarbylphosphine ligand. The ratio of $H_2$ to CO employed was 2.0. The concentration of catalyst complex in the reaction mixture was 0.2% weight based on cobalt metal. The catalyst complex was prepared by reacting dicobalt octacarbonyl with the trihydrocarbylphosphine in situ in the presence of carbon monoxide and hydrogen, in a ratio of trihydrocarbylphosphine to dicobalt octacarbonyl of 2, at a temperature of 200° C. The complex formed was found to have the empirical structure represented by the formula $XCo(CO)_3$ wherein X represents the trihydrocarbylphosphine ligand. The catalyst complex, and ligand component thereof, used in each operation, and the results obtained therewith are given below:

Run 10:
 Catalyst: cobalt-carbonyldiphenylethylphosphine
 Ligand: diphenylethylphosphine $(\phi_2P(C_2H_5))$
 Dodecene conversion, percent: 96.3
 Selectivity to $C_{13}$ alcohols, percent: 89.8
 n-Tridecanol-1 content of $C_{13}$ alcohols, percent: 60.2

Run 11:
 Catalyst: cobalt-carbonyl-dimethylphenylphosphine
 Ligand: dimethylphenylphosphine $((CH_3)_2P\phi)$
 Dodecene conversion, percent: 99
 Selectivity to $C_{13}$ alcohols, percent: 92
 n-Tridecanol-1 content of $C_{13}$ alcohols, percent: 75.2

Run 12:
 Catalyst: cobalt-carbonyl-diphenyl-n-octylphosphine
 Ligand: diphenyl-n-octylphosphine $(\phi_2P\text{-n-octyl})$
 Dodecene conversion, percent: 96
 Selectivity to $C_{13}$ alcohol, percent: 86
 n-Tridecanol-1 content of $C_{13}$ alcohols, percent: 72

Run 13:
 Catalyst: cobalt-carbonyl-diphenyl-n-butylphosphine
 Ligand: diphenyl-n-butylphosphine $(\phi_2P\text{n-butyl})$
 Dodecene conversion, percent: 96
 Selectivity to $C_{13}$ alcohols, percent: 85
 n-Tridecanol-1 content of $C_{13}$ alcohols, percent: 73

Example XI

A diethylphenylphosphine-cobalt-carbonyl complex catalyst was prepared by heating for a period of 4 hours at a temperature of 170° C. a solution of 36 grams cobalt naphthenate in 300 cc. of isooctane containing 17.2 grams of diethylphenylphosphine under a carbon monoxide and hydrogen pressure of 500 p.s.i.g. Thereafter the resulting mixture was cooled and filtered. A yellow precipitate which formed was separated from a red filtrate. The filtrate was then cooled to 5° C. to crystallize out a red precipitate which was recovered by filtration. The red precipitate thus obtained upon analysis was shown to be a diethylphenylphosphine-cobalt-carbonyl of the empirical formula:

$$[[(C_2H_5)_2P(C_6H_5)](Co(CO)_3)]_2$$

Hydroformylation of dodecene-1 in a single stage operation at 1000 p.s.i.g., 200° C. with a $H_2/CO$ molar ratio of 2/1 with the red diethylphenylphosphine-cobalt-carbonyl catalyst resulted in a conversion to alcohols and aldehydes of 97% with a selectivity to $C_{13}$ alcohols of 86%. The $C_{13}$ alcohol product contained 74% n-tridecene-1.

We claim as our invention:

1. The process for the production of aldehydes and alcohols which comprises contacting an olefinic hydrocarbon with carbon monoxide and hydrogen at a temperature of from about 100° to about 300° C. in the presence of a complex catalyst consisting essentially of cobalt in complex combination with carbon monoxide and a trihydrocarbylphosphine in which both an alkyl group and an aryl group and only alkyl and aryl groups are directly attached to the phosphorus atom of the trihydrocarbylphosphine thereby reacting said olefinic hydrocarbon with carbon monoxide and hydrogen with the formation of aldehydes and alcohols having one more carbon atom than said olefinic hydrocarbon.

2. The process for the production of aldehydes and alcohols which comprises contacting an olefinic hydrocarbon with carbon monoxide and hydrogen at a temperature of from about 100° to about 300° C. in the presence of a complex catalyst consisting essentially of cobalt in complex combination with carbon monoxide and a trihydrocarbylphosphine of the empirical formula $PR^1R^2R^3$ wherein R is an alkyl radical, $R^2$ is an aryl radical, and $R^3$ is an $R^1$ or $R^2$ radical, thereby reacting said olefinic hydrocarbon with carbon monoxide and hydrogen with the formation of aldehydes and alcohols having one more carbon atom than said olefinic hydrocarbon.

3. The process in accordance with claim 2 wherein $R^1$ and $R^3$ are unsubstituted alkyl radicals and $R^2$ is an unsubstituted aryl radical.

4. The process in accordance with claim 2 wherein $R^1$ and $R^3$ are unsubstituted aryl radicals and $R^2$ is an unsubstituted alkyl radical.

5. The process for the production of oxygenated hydrocarbons consisting essentially of aliphatic aldehydes and alcohols which comprises contacting an aliphatic olefinic hydrocarbon at a temperature of from about 100° to about 300° C. and a pressure of from about 1 atmosphere to about 3000 p.s.i.g. with a catalyst consisting essentially of cobalt in complex combination with carbon monoxide and a dialkylphenylphosphine, thereby reacting said aliphatic olefinic hydrocarbon with carbon monoxide and hydrogen with the formation of aliphatic aldehydes and alcohols having one more carbon atom to the molecule than said aliphatic olefinic hydrocarbon.

6. The process for the production of oxygenated hydrocarbons consisting essentially of aliphatic aldehydes and alcohols which comprises contacting an aliphatic olefinic hydrocarbon at a temperature of from about 100° to about 300° C. and a pressure of from about 1 atmosphere to about 3000 p.s.i.g. with a catalyst consisting essentially of cobalt in complex combination with carbon monoxide and a diphenylalkylphosphine, thereby reacting said aliphatic olefinic hydrocarbon with carbon monoxide and hydrogen with the formation of aliphatic aldehydes and alcohols having one more carbon atom to the molecule than said aliphatic olefinic hydrocarbon.

7. The process in accordance with claim 5 wherein said dialkylphenylphosphine is diethylphenylphosphine.

8. The process in accordance with claim 5 wherein said dialkylphenylphosphine is dilaurylphenylphosphine.

9. The process in accoradnce with claim 7 wherein said diarylalkylphosphine is diphenylethylphosphine.

10. The process in accordance with claim 7 wherein said diarylalkylphosphine is diphenyllaurylphosphine.

11. The process for the production of aliphatic aldehydes and alcohols having from 3 to 20 carbon atoms to the molecule which comprises reacting an aliphatic mono-olefinic hydrocarbon having from 2 to 19 carbon atoms to the molecule, at a temperature of from about 100° to about 300° C., in the presence of a complex catalyst represented by the simplest empirical formula:

$$(PR^1R^2R^3)_pCo(CO)_n$$

wherein $R^1$ is alkyl, $R^2$ is a member of the group consisting of aryl and aralkyl, $R^3$ is a member of the group consisting of alkyl, aryl and aralkyl, and $p$ and $n$ are integers whose sum is 4 and which each have a minimum value of 1.

12. The process for the production of aliphatic aldehydes and alcohols having from 3 to 20 carbon atoms to the molecule which comprises reacting an aliphatic mono-olefinic hydrocarbon having from 2 to 19 carbon atoms to the molecule, at a temperature of from about 100 to about 300° C. and a presusrs of from about 1 atmosphere to about 2000 p.s.i.g., in the presence of a complex catalyst consisting essentially of cobalt in complex combination with carbon monoxide and a dialkylphenylphosphine having from 1 to 20 carbons in each alkyl group.

13. The process for the production of aliphatic aldehydes and alcohols having from 3 to 20 carbon atoms to the molecule which comprises reacting an aliphatic mono-olefinic hydrocarbon having from 2 to 19 carbon atoms to the molecule, at a temperature of from about 100 to about 300° C. and a pressure of from about 1 atmosphere to about 2000 p.s.i.g., in the presence of a complex catalyst consisting essentially of cobalt in complex combination with carbon monoxide and a diphenylalkylphosphine having from 1 to 20 carbon atoms in the alkyl group.

14. The process in accordance with claim 12 wherein said dialkylphenylphosphine is dilaurylphenylphosphine.

15. The process in accordance with claim 13 wherein said diphenylalkylphosphine is diphenyllaurylphosphine.

16. The process for the direct single-stage conversion of an olefinic hydrocarbon having from 2 to 19 carbon atoms to the molecule to the corresponding aldehydes and alcohols having one more carbon atom to the molecule than said olefinic hydrocarbon which comprises reacting said olefinic hydrocarbon with carbon monoxide and hydrogen at a temperature of from about 100 to about 300° C. and a pressure of from about 1 atmosphere to about 2000 p.s.i.g., in the presence of a complex catalyst of the simplest empirical formula:

$$(PR^1R^2R^3)_pCo(CO)_n$$

wherein $R^1$ and $R^2$ are each an alkyl group having from 1 to 20 carbon atoms, $R^3$ is a phenyl group, and $p$ and $n$ are integers whose sum is 4 and which each have a minimum value of 1.

17. The process for the direct, single-stage production of a straight chain terminal alcohol having from 4 to 20 carbon atoms to the molecule which comprises contacting a striaght chain internal olefin having from 4 to 19 carbon atoms to the molecule with carbon monoxide and hydrogen at a temperature of from about 100 to about 300° C. and a pressure of from about 1 atmosphere to about 2000 p.s.i.g. with a complex catalyst of the simplest empirical formula $$(PR^1R^2R^3)_pCo(CO)_n$$

wherein $R^1$ and $R^2$ are each an alkyl group having from 1 to 20 carbon atoms, $R^3$ is a phenyl group, and $p$ and $n$ are integers whose sum is 4 and which each have a minimum value of 1, thereby reacting said internal monoolefin with said carbon monoxide and hydrogen with the formation of reaction products perdominating in a straight chain terminal alkanol having one more carbon atom to the molecule than said mono-olefin.

18. The process for the direct, single-stage production of a straight chain terminal alcohol having from 5 to 20 carbon atoms to the molecule which comprises contacting a straight chain internal olefin having from 4 to 19 carbon atoms to the molecule with carbon monoxide and hydrogen at a temperature of from about 100 to about 300° C. and a pressure of from about 1 atmosphere to about 2000 p.s.i.g. with a complex catalyst of the empirical formula $$[[(C_{12}H_{25})_2P(C_6H_5)]Co(CO)_3]_2$$

thereby reacting said internal monoolefin with said carbon monoxide and hydrogen with the formation of reaction products predominating in a straight chain terminal alkanol having one more carbon atom to the molecule than said mono-olefin.

19. The process for the production of n-tridecanol-1 which comprises reacting dodecene-1 with carbon monoxide and hydrogen at a temeprature of from about 100 to about 300° C., at a pressure of from about 300 to about 1500 p.s.i.g. in the presence of a complex catalyst of the simplest empirical formula:

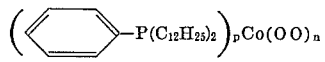

wherein $p$ and $n$ are integers whose sum is 4 and which each have a minimum value of 1.

20. The process for the production of n-hexanol which comprises reacting a normal pentene with carbon monoxide and hydrogen at a temperature of from about 100 to about 300° C., and a pressure of from about 400 to about 800 p.s.i.g., in the presence of a catalyst consisting essentially of cobalt in complex combination with carbon monoxide and diethylphenylphosphine.

References Cited

UNITED STATES PATENTS 3,274,263  9/1966  Greene et al.
3,102,899  9/1963  Cannell _____ 260—439

LEON ZITVER, *Primary Examiner.*

R. H. LILES, *Assistant Examiner.*

U.S. Cl. X.R.

252—431; 260—439, 483, 484, 598, 599, 632, 617, 618